Figure 2:
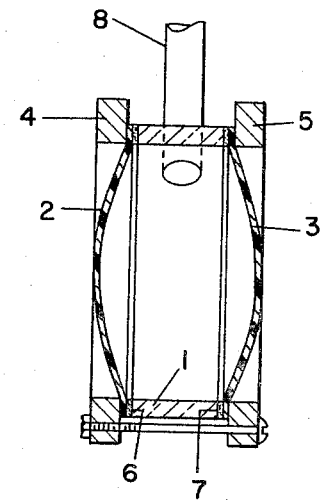

Feb. 21, 1967  J. F. PAULSON  3,305,595
AROMATICS SEPARATION AND PURIFICATION BY DIALYSIS
Filed June 18, 1963

INVENTOR.
JOSEPH F. PAULSON
BY George L. Church
ATTORNEY

United States Patent Office 3,305,595
Patented Feb. 21, 1967

3,305,595
AROMATICS SEPARATION AND PURIFICATION BY DIALYSIS
Joseph F. Paulson, Claymont, Del., assignor to Sun Oil Company, Philadelphia, Pa., a corporation of New Jersey
Filed June 18, 1963, Ser. No. 288,768
1 Claim. (Cl. 260—674)

This invention relates to the dialysis of heavy aromatic oils.

Dialysis is the separation of solutes by means of their unequal diffusion through membranes or diaphragms. The term denotes the separation of colloids from non-colloids.

Generally speaking, the process involves partitioning a suitable vessel to obtain two bodies of liquid separated by the dialyzing membrane or film. The undialyzed liquid comprises aromatic oil—containing resinous maltene and asphaltene particles—dissolved and dispersed in a paraffinic solvent, and the dialyzate passes through the membrane into a receiving solvent. The dialyzate has a lighter color, increased aromaticity, and a lower metals content.

Diffusion rate is usually improved by heating the cell, and a temperature differential between the undialized liquid and the receiving solvent can be used, if desired. Any suitable arrangement of apparatus can be used—either the bag type or the compartment type being satisfactory. A pressure differential across the membrane can be used, if desired.

The process can be applied to any heavy aromatic oil containing asphaltic components. Oils of this type are produced in such refinery processes as cracking, solvent extraction, deasphalting, and distillation of asphaltic crude oils, particularly vacuum distillation or combinations of the above processes. By the term "aromatic" we mean oils containing substantial amounts of carbon atoms in aromatic rings, i.e., $C_a=30$ to 60 percent and a viscosity-gravity constant ranging from .91 to 1.05. (This method of classifying oils is described in Analytical Chemistry, volume 30, page 1224 (1958) and Hill et al., Industrial and Engineering Chemistry, volume 20, page 641 (1928).) The undialyzed feed is usually black or nearly black in color due to the presence of resins, asphaltenes, carbenes, and carboids. The resins and asphaltenes are complex molecules containing many aromatic rings, and they are characterized by the presence of functional groups and often by the presence of sulfur, nitrogen, and metal atoms.

The oil is dissolved and dispersed in a paraffinic solvent. Suitable solvents include aliphatic and cycloaliphatic hydrocarbons having from 4 to 12 carbon atoms. Aromatic solvents are not satisfactory because they promote the passage of resins and asphaltenes through the film. The receiving solvent is usually the same as the dissolving or dispersing solvent, but different solvents can be used.

The cell can be operated at temperatures ranging from about 20° C. to about 175° C. Pressure can be from 15–100 p.s.i.a., but the pressure differential across the film must be relatively low, i.e., 0–10 p.s.i.

The membrane must provide a good diffusion rate and be strong enough to stand the conditions of the process. I have found that polypropylene films having a high crystallinity have good permeability and selectivity for aromatic oils. Crystallinity of polymer films can be defined by density and by solubility. The non-crystalline or incompletely crystalline components of polypropylene are soluble in normal hydrocarbon solvents and the usual standard is the solubility in n-hexane at reflux temperature. I have found that polypropylene films having a maximum extractable fraction of .1 to 50 weight percent, preferably .1 to 6.4 weight percent, when extracted with n-hexane at reflux temperature are efficient for removing heavy aromatics from aromatic oils. The density of the film ranges from .87 to .92. Suitable film thicknesses ranging from 0.05 to 10 mils can be used with 1.0 to 5.0 mils being preferred. The films are made from polypropylene prepared by polymerization of propylene in the presence of a Ziegler-type polymerization catalyst. The films can be extruded or cast and can be mono- or bi-axially oriented by stretching. Prior to use the film can be treated with hydrocarbon solvents—with or without heating as a reconditioning step.

Figure 1:
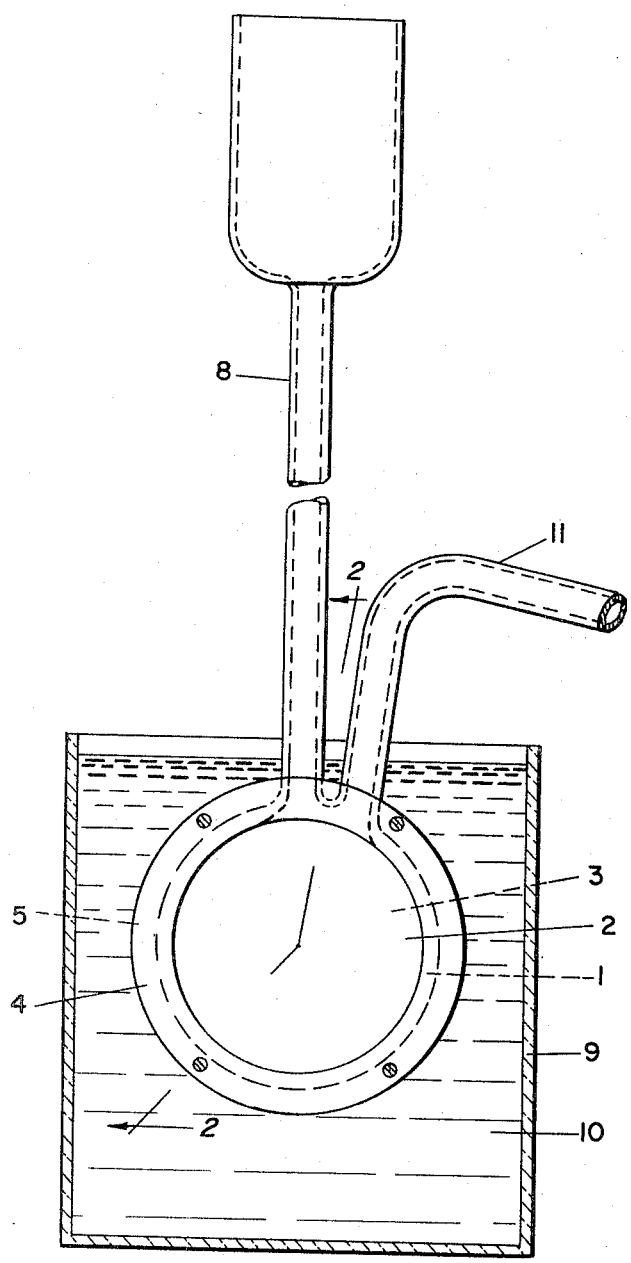

The apparatus used for the specific examples which follow is shown in the drawing in which FIGURE 1 is a front view and FIGURE 2 is a partial side view taken along line 2—2 of FIGURE 1. The membrane holder consisted of a 3/16 inch thick glass ring 1 having an inside diameter of about 1.8 inch and a width of about ½ inch. Two polypropylene membranes 2 and 3 were held in position over the sides of the ring by metal rings 4 and 5. The rings had internal "Teflon" gaskets 6 and 7. The inner diameter of the metal rings was approximately the same as the diameter of the glass ring, and thus the two polypropylene membranes had a surface area of approximately 6.0 square inches available for dialysis. The oil and solvent were introduced through tube 8. The membrane holder was immersed in a vessel 9 containing the receiving solvent 10. Since a part of the receiving solvent passed through the membranes into the oil-solvent mixture, an overflow tube 11 was employed. The receiving solvent was heated by an electric heating device, not shown and stirred magnetically. The temperature was maintained in the range of 70–90° C., and the length of the runs was about 1–4 hours. The runs were at ambient pressure.

Example I

A black, opaque, aromatic rubber process oil having the following characteristics was dialyzed through polypropylene film:

| | |
|---|---|
| Specific gravity at 60° F. | 0.9834 |
| Viscosity, SUS at 100° F. | 2690 |
| Viscosity, SUS at 210° F. | 83 |
| Viscosity-gravity constant | 0.936 |
| ASTM color (1% diluted) | 1.5 |
| Composition: | |
|    Aromatic carbon atoms, percent | 37 |
|    Naphthenic carbon atoms, percent | 29 |
|    Paraffinic carbon atoms, percent | 34 |
| Aromatics, silica gel, weight percent | 77.2 |

Fourteen milliliters of the above oil diluted with 11 milliliters of n-heptane were introduced into the apparatus described above. Five hundred milliliters of normal heptane was used as the receiving solvent. The solution was dialyzed through a 4.5 mil polypropylene film having a maximum extractable fraction of less than 6.4 percent (n-hexane), a density of 0.89 and a tensile strength (MD) of 5700. Dialysis was continued at a temperature ranging from 80–96° C. for 2½ hours. The dialyzed oil was recovered from the receiving solvent by evaporation. Seven milliliters of dark red oil having an ASTM color of 1.5 L (ligher) was recovered. The product oil had an ultraviolet absorbtivity at 260 M$\mu$ of 30.6 compared to 24.7 for the non-permeated oil. This indicates that the permeate is more aromatic. The lighter color shows that resins and asphaltenes are separated by dialysis. The product oil is more acceptable for rubber processing and for other uses than the black original oil.

Example 2

The above example was repeated employing benzene as the solvent. After 12 hours the permeate consisted of 4 milliliters of black opaque oil. This shows that aromatic solvents are not suitable for the process.

*Example 3*

A sample of black, opaque, vacuum tower bottoms containing 98 p.p.m. vanadium and 38 p.p.m. nickel wat dispersed in n-hexane and the dispersion dialyzed through a 1.5 milliliter polypropylene film for about 20 hours. The dialyzate was a clear dark red oil containing only 3 p.p.m. vanadium and 5 p.p.m. nickel. Since metals are found in residuums as complex organometallic compounds concentrated in the resinous and solid portions of the oil, the example shows that undesired metals as well as undesired resins and solids are removed from oils by dialysis.

*Example 4*

A black, opaque rubber process oil having the following characteristics was dialyzed through polypropylene film:

| | |
|---|---|
| Specific gravity at 60° F. | 0.9937 |
| Viscosity, SUS at 100° F. | 7200 |
| Viscosity, SUS at 210° F. | 126 |
| Viscosity-gravity constant | 0.941 |
| Composition: | |
| Aromatic carbon atoms, percent | 41 |
| Naphthenic carbon atoms, percent | 22 |
| Paraffinic carbon atoms, percent | 37 |
| Aromatics, silica gel, weight, percent | 79.1 |

Fifty-eight milliliters of the oil was dissolved and dispersed in 60 milliliters of n-hexane and the mixture introduced into the apparatus shown in the drawing. One liter of n-pentane was used as the receiving solvent. The mixture was dialyzed through a 1.0 mil polypropylene film having a maximum extractable fraction of less than 5.0 percent (n-hexane), a density in the range of 0.885–0.895, and a tensile strength (MD) of 7600 p.s.i. The dialysis was continued for one week at ambient pressure and a temperature ranging from 70 to 80° F. There was a certain amount of back-mixing due to the passage of some of the dialyzed oil and receiving solvent back through the membrane. This occasionally caused the cell to overflow through the overflow tube—line 11 of the drawing. The solvent was evaporated from the overflow and the oil portion returned to the cell. About 40 weight percent of the oil was dialyzed. The following comparative properties were observed:

| Sample | Color | Density ($D_4^{20}$) | Ultraviolet Absorbtivity 2C0 M$\mu$ | Mol. Wt. | Kinematic Viscosity at 210° F. |
|---|---|---|---|---|---|
| Original Oil | Black opaque (ASTM 2.0) (1% diluted) | 1.5627 | 43.2 | 399 | 24.0 |
| Dialyzate | Dark red clear (ASTM 1.5) (1% diluted) | 1.5770 | 58.6 | 351 | 13.2 |
| Non-dialyzate | Black opaque | 1.5585 | 19.3 | 428 | 25.6 |

Thus it can be seen that dialysis employing paraffinic solvents and polypropylene films is an effective method for purifying and upgrading aromatic oils containing resins and solids.

I claim:

Process for increasing the aromatics content and decreasing the quantity of colloidal color bodies in an aromatic oil containing asphaltic components which comprises dialyzing a solution-dispersion of the aromatic oil in a paraffinic solvent through a polypropylene film, said film having a specific gravity of 0.87 to 0.92 and having a maximum extractable fraction of 0.1 to 50 weight percent when extracted with n-hexane at reflux temperature, and recovering the dialyzate.

References Cited by the Examiner

UNITED STATES PATENTS

| | | | |
|---|---|---|---|
| 1,756,981 | 5/1930 | Jurrissen | 208—290 |
| 2,415,541 | 2/1947 | Soday | 260—674 |
| 2,913,507 | 11/1959 | Binning et al. | 260—683.44 |
| 3,223,614 | 12/1965 | Paulson | 208—290 |

DELBERT E. GANTZ, *Primary Examiner.*

C. E. SPRESSER, *Assistant Examiner.*